United States Patent [19]

Breitling

[11] Patent Number: 4,528,629
[45] Date of Patent: Jul. 9, 1985

[54] ELECTRONIC CONTROL APPARATUS WITH DEFINED RESET FUNCTION

[75] Inventor: Wolfram Breitling, Sachsenheim, Fed. Rep. of Germany

[73] Assignee: Robert Bosch GmbH, Stuttgart, Fed. Rep. of Germany

[21] Appl. No.: 374,625

[22] Filed: May 3, 1982

[30] Foreign Application Priority Data

May 14, 1981 [DE] Fed. Rep. of Germany ....... 3119117

[51] Int. Cl.³ .............................. G06F 1/04; G06F 9/22
[52] U.S. Cl. ................................ 364/431.11; 364/900;
307/592
[58] Field of Search ........ 364/200, 900, 200 MS File,
364/900 MS File, 431.11; 324/102, 133, 103 P;
307/590, 592

[56] References Cited

U.S. PATENT DOCUMENTS

| 3,987,393 | 10/1976 | Knauer | 324/102 |
|---|---|---|---|
| 4,087,855 | 5/1978 | Bennett et al. | 364/200 |
| 4,275,445 | 6/1981 | DiPietro Elizaran | 364/200 |
| 4,361,876 | 11/1982 | Groves | 364/900 |
| 4,363,092 | 12/1982 | Abo et al. | 364/200 |
| 4,386,401 | 5/1983 | O'Brien | 364/200 |
| 4,408,328 | 10/1983 | Wakai | 364/200 |
| 4,414,623 | 11/1983 | Davis et al. | 364/200 |
| 4,432,049 | 2/1984 | Shaw et al. | 364/200 |

OTHER PUBLICATIONS

Practical Hardware Details for 8080, 8085, Z80 & 6800 Microprocessor Systems, pp. 88-89, James Coffron, 1981.

Primary Examiner—Gareth D. Shaw
Assistant Examiner—Daniel K. Dorsey
Attorney, Agent, or Firm—Frishauf, Holtz, Goodman & Woodward

[57] ABSTRACT

To provide for starting of signal processing operations in a microprocessor (7), for example an automotive-type microprocessor, subject to frequent power interruptions, in which the processing operations are controlled by clock signals from a clock generator (1), and to insure that the microprocessor carries out its computation cycles only after the clock signal generator (1) provides clock signals at an adequate level appropriate for microprocessor operations, the level of the clock signals is sensed, for example in a peak rectifier (2, 3, 5) to reset the microprocessor when the clock signals have reached this level, thereby insuring commencing of processing cycles from a predetermined condition or state of the microprocessor at a time when adequate clock signals are available. The reset signal from the clock generator can be logically combined in a logic circuit (6) with externally generated reset signals, for example dependent on sufficient or suitable operating voltage being present for operation of the microprocessor from a power source (P), for example the battery of an automotive vehicle, to insure operation of the microprocessor only with adequate battery voltage being present, for example after termination of power drain by a starter motor.

8 Claims, 1 Drawing Figure

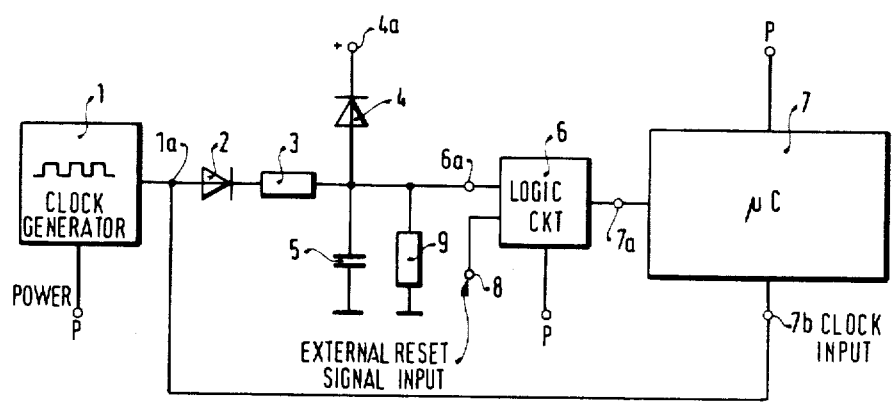

ELECTRONIC CONTROL APPARATUS WITH DEFINED RESET FUNCTION

The present invention relates to electronic control apparatus, and more particularly to electronic control apparatus which operates in accordance with predetermined clock signals, such as microprocessors; and especially to such apparatus suitable for use in installations in which operation of the microprocessors is frequently interrupted at random times, for example microprocessors installed in automotive vehicles.

BACKGROUND

Various types of electrical apparatus, such as microprocessors, memory systems and arrays, computation circuits, and the like, operate in accordance with fixed clock signals. It is well known that such apparatus should be reset to a predetermined state after interruption of supply voltage. In order to reset the electronic apparatus, it has previously been proposed to generate a short, usually sharp voltage pulse upon energization of the apparatus, which is used as a reset pulse to reset the apparatus to the defined predetermined state. It has been found that such resetting will not, however, necessarily have the desired effect since a clock generator which, frequently, is powered by the same source as the microprocessor, will have not have started full oscillation at the time the reset pulse is received in the remainder of the apparatus. It is thus possible that undefined, stray or interference pulses which might arise upon starting might interfere with the operation of the system, by simulating clock pulses, or being processed in the form of clock pulses. Such stray pulses would, then, cause operation of the electronic apparatus so that, when the actual clock pulses start, the state of the apparatus will not be as thought, that is, in the predetermined defined state, but rather in the random state as determined by such extraneous or stray pulses. Thus, voltage-dependent resetting of electronic control apparatus is often not sufficient to reset the apparatus to the predetermined state. The problem is particularly acute in connection with automotive-type microprocessor control systems due to the frequent and random interruption of power supply thereto. Upon removal of all electrical power from the vehicle, for example upon opening of a main switch, or removal of the battery, operation of the microprocessor is terminated; likewise, the clock signal generator which furnishes predetermined clock signals is shut down. Restarting of the clock signal, as well as the microprocessor, will occur at random times, as determined and desired by the operator of the vehicle. It is important that the microprocessor start operation from a predetermined state in order to properly process sensed signals derived from engine sensors, for example.

THE INVENTION

It is an object to so control operation of electronic control apparatus, and especially microprocessors and associated apparatus, particularly when used in an automotive environment where random and frequent interruption or shutdown and restarting may occur, and in which operation of the microprocessor, as programmed, is insured.

Briefly, a system is provided to insure oscillation of the clock generator, providing clock pulses before the microprocessor itself is enabled upon resumption of processing operation, for example after shutdown or interruption of power supply thereto. In accordance with a feature of the invention, a rectifier is provided connected to the clock generator and rectifying the output thereof. The rectified output is connected to the reset input of the electrical apparatus, typically the microprocessor, so that only when the clock generator provides a defined predetermined output sufficient to stably operate, the microprocessor itself will be enabled. The circuit connection to the microprocessor to start it after reset may include logic gates which require both a starting pulse to start the microprocessor and sufficient clock signal output which, upon concurrence of both, then reset the microprocessor for subsequent processing operations under control of the then available clock signals.

The system has the advantage that the microprocessor will be reset only when the clock generator already is fully oscillating. This, then, insures that one of the essential control signals utilized by the circuit of the control system is reliably present after the reset terminal has been energized. The system has the further advantage that the microprocessor will be reset to start new computations or new processing sequences or cycles each time that clock pulses should fail, for example upon momentary or short-time failure of operation of the clock generator, or upon masking of clock signals, for example by stray noise signals which may arise in automotive vehicles, for example when the vehicle passes beneath or adjacent to a high-tension power line, a railroad catenary system, or another installation which may induce stray signals of sufficient strength to mask operating signals within a processing system.

In accordance with a preferred feature of the invention, the reset signal derived from the clock generator is logically joined with a voltage-dependent or otherwise generated external reset pulse. This arrangement permits resetting of the microprocessor and other electronic equipment either manually or in conjunction with operating conditions, e.g. (a) proper oscillation of the clock generator, and (b) presence of adequate supply voltage. The microprocessor will then operate only if both conditions are satisfied.

In accordance with a preferred feature of the invention, the reset circuit and/or the clock generator is at least, in part, integrated with the microprocessor, thereby reducing external accessory circuits used in connection therewith.

DRAWING

The single FIGURE is a schematic block diagram of the system of the present invention.

DETAILED DESCRIPTION

A clock generator 1 has its output 1 $a$ connected to the clock input terminal 7$b$ of a microprocessor 7. The output of the clock generator 1 further is connected to a diode 2 and a resistor 3 in series therewith. Resistor 3 is connected to an input 6$a$ of a logic circuit 6. Positive supply voltage applied from terminal 4$a$ is connected through a diode 4 to the input terminal 6$a$ of the logic circuit 6. The input terminal 6$a$ of the logic circuit is, additionally, connected to ground or chassis through an R/C circuit 9, 5. The logic circuit 6 has an additional input 8 to which an external reset pulse can be connected. The output of the logic circuit 6 is connected to the reset input 7$a$ of the microprocessor 7. The external reset pulse to terminal 8 can be derived, for example, from a differentiating circuit connected to the operating control switch for the microprocessor 7 so that, when the operating control switch is energized, a pulse will be available at terminal 8. The length of the pulse can be suitably timed.

Operation: Let it be assumed that the microprocessor 7 should operate. The logic circuit 6 and the clock generator 1 will be supplied with external operating power, for example derived from a power source P. The logic circuit 6 is so arranged that its output will have a signal appear thereon which retains the microprocessor 7 in reset condition. When the generator 1 is oscillating fully, a clock signal will be available at its output terminal 1a which is rectified by the peak rectifier formed by diode 2 and resistor 3 as well as capacitor 5. Diode 2 rectifies the output from clock generator 1 and, when the value of the rectified output signal is sufficiently high, it will be suitable for energization of the logic circuit 6. Resistor 9 is a pull-down resistor which prevents undesired charge accumulation on the logic circuit 6. Diode 4 permits rapid discharge of capacitor 5 upon disconnection of operating power from terminal P. A logic 1-signal at the output of the peak rectifier 2, 3, 5 then provides cancellation of the reset signal being applied to the input terminal 7a of the microprocessor 7.

The logic circuit 6 is not strictly necessary. It can be eliminated if the reset input 7a of the microprocessor 7 should be switched only based on clock pulses from the clock pulse generator 1. In accordance with circuit selection and requirements, the logic circuit 6 can be formed as an AND-gate, an OR-gate, a NAND-gate, or as a NOR-gate; alternatively, it can be formed as a flip-flop. If the reset pulse should only be cancelled when a concurrence of conditions occurs: (a) suitable oscillation of the clock generator 1, and (b) adequate operating voltage suitable for microprocessor operation, then the logic circuit 6 should be formed, depending on the internal circuit structure of the microprocessor 7, either as an AND-gate or as a NAND-gate. The reset cycle is terminated then only when: (a) the clock generator 1 oscillates properly, and (b) the voltage-dependent reset signal is available on terminal 8. Manual resetting can be achieved by means of a manually operable switch connected, for example, to terminal 8. Under such conditions, the logic circuit 6 preferably is selected to be an OR-gate or a NOR-gate. The microprocessor then can be reset either upon manual operation of the switch (not shown) or upon failure of clock signals from the clock generator 1.

The number of the reset inputs applied to the logic circuit 6, that is, the types of reset signals applied to terminal 8, for example through an OR-gate, can be extended as required; the logic interconnection of these additional signals will be determined by the particular wiring and logic structure of the microprocessor 7 as well as by the desired number of signals and their characteristics.

The clock signals from clock generator 1, after the microprocessor has been reset, are applied from the output terminal 1a to the clock input 7b of the microprocessor.

The entire circuit arrangement, including the reset control terminal 7a, and the other circuit components can be integrated with the microprocessor chip. This, then, reduces the number of externally required structural elements.

The system is not limited to use with microprocessors, but can be used with any type of electrical control apparatus which functions in accordance with recurring clock signals, such as various types of computation apparatus, storage and memory circuits, and the like, as well as digitally operating control systems.

I claim:

1. Post-interruption resetting system for electronic control apparatus (7) having
    a clock generator (1) connected to supply clock pulses to the electronic control apparatus;
    and a reset control terminal (7a) connected to and selectively controlling resetting and operation of the electronic control apparatus (7), in dependence on a characteristic of a control signal applied to the reset terminal (7a) and holding said control apparatus (7) in reset condition until change of the characteristic of said control signal;
    comprising, in accordance with the invention,
    means (2, 3, 5) connected to the clock generator for sensing oscillatory output of the clock generator and providing an output signal when the oscillatory output is at a level sufficient for stable operation of said electronic control apparatus (7);
    and circuit means (6a, 6) connecting the output signal of said oscillation level sensing means to the reset control terminal (7a) of said electronic control apparatus upon sensing operation of the clock generator at a level sufficient for stable operation of the electronic control apparatus (7),
    said output signal of the sensing means changing the characteristic of the control signal being applied to the reset terminal (7a) of the electronic control apparatus (7) to enable operation of the electronic control apparatus only when the clock signals supplied thereto are at said level sufficient for stable operation of the electronic control apparatus.

2. System according to claim 1, wherein said sensing means comprises a rectifier system (2, 3, 5) connected to and rectifying the output from said clock generator (1), and providing an oscillation level signal, said oscillation level signal being connected to said circuit means (6, 6a).

3. System according to claim 1, wherein said circuit means includes a logic circuit (6);
    and means (8) are provided, coupled to said logic circuit for applying an external reset signal to said logic circuit, said logic circuit logically combining the external reset signal with the output signal derived from said sensing means,
    said logically combined signal forming said control signal and having said changed characteristic when the output signal is provided by the sensing means indicative of operation of the clock generator at said level sufficient for stable operation of the electronic control apparatus (7).

4. System according to claim 1, wherein said electronic control apparatus comprises a microprocessor (7), and at least part of said sensing means and part of said circuit means form an integrated circuit with the microprocessor.

5. System according to claim 1, wherein said electronic control apparatus comprises a vehicular-type microprocessor (7); the power source (P) is common to said clock generator (1) and to said microprocessor;
    the circuit means includes a logic circuit (6) having an input connected to said power source (P), and another input connected to receive the output signal from said sensing means, the logic circuit logically determining:

(a) operation of said clock generator at said level sufficient for stable operation of the microprocessor (7);

(b) voltage of said power source (P) at a level sufficient for stable operation of the microprocessor, said logic circuit providing said control signal which, upon conjunction of the conditions (a) and (b), has said changed characteristic to permit starting of a processing cycle in the microprocessor, and to enable a clock input (7b) of the microprocessor to receive clock signals from the clock generator (1) for carrying out a signal processing operation from a predetermined condition.

6. System according to claim 3, wherein said electronic control apparatus comprises a microprocessor (7), and at least part of said sensing means and part of said circuit means form an integrated circuit with the microprocessor.

7. Method of starting signal processing operations in a signal processing apparatus (7) utilizing clock signals applied and connected to the signal processing apparatus wherein the signal processing apparatus has a reset terminal (7a) to which a signal is applied which signal, in accordance with a predetermined characteristic thereof, holds the apparatus in reset condition until change of said characteristic of the control signal comprising, in accordance with the invention, the steps of generating clock signals;

determining when the clock signals have reached a level sufficient for stable signal processing operation by the signal processing apparatus;

changing said predetermined characteristic of the control signal being applied to said reset terminal of said signal processing apparatus as a consequence of the determination that the clock signals have reached said level sufficient for stable signal processing operation by the signal processing apparatus for starting a processing cycle only upon sensing that the level of the generated clock signals is at said level for stable processing operations by the signal processing apparatus.

8. Method according to claim 7, including the further step of sensing the level of an operating parameter required for signal processing operations by the signal processing apparatus and deriving a sensed signal;

and logically combining the sensed signal representative of said operating parameter, and the level of the clock signals, and determining if the following conditions are satisfied:

(a) the clock signals are at a level suitable for signal processing operations, and (b) said operating parameter is at a level sufficient for stable operation of the signal processing apparatus; and starting a processing cycle in the signal processing apparatus only upon said determination that said conditions (a) and (b) are satisfied.

* * * * *